United States Patent
Ji et al.

(10) Patent No.: US 9,822,855 B2
(45) Date of Patent: Nov. 21, 2017

(54) PLANETARY GEAR TRAIN OF AUTOMATIC TRANSMISSION FOR VEHICLES

(71) Applicant: Hyundai Motor Company, Seoul (KR)

(72) Inventors: Seongwook Ji, Gunpo-si (KR); Seong Wook Hwang, Gunpo-si (KR); Hyun Sik Kwon, Seoul (KR); Wonmin Cho, Hwaseong-si (KR); Jae Chang Kook, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/266,828

(22) Filed: Sep. 15, 2016

(65) Prior Publication Data
US 2017/0159771 A1  Jun. 8, 2017

(30) Foreign Application Priority Data
Dec. 2, 2015  (KR) .................. 10-2015-0170991

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 7,651,431 B2 | 1/2010 | Phillips et al. |
| 2009/0011891 A1* | 1/2009 | Phillips .................... F16H 3/66 |
| | | 475/275 |

FOREIGN PATENT DOCUMENTS

| JP | 2015-155719 A | 8/2015 |
| KR | 10-2011-0131816 A | 12/2011 |
| KR | 10-1090813 B1 | 12/2011 |

* cited by examiner

*Primary Examiner* — Erin D Bishop
(74) *Attorney, Agent, or Firm* — Morgan, Lewis & Bockius LLP

(57) ABSTRACT

A planetary gear train of an automatic transmission for a vehicle may include an input shaft for receiving an engine torque, an output shaft for outputting a shifted torque, a first planetary gear set, a second planetary gear, a third planetary gear set, a fourth planetary gear set, six control elements, a first shaft selectively connectable with a transmission housing, a second shaft, a third shaft, a fourth shaft directly connected with the input shaft, a fifth shaft selectively connectable with the third shaft, and selectively connectable with the transmission housing, a sixth shaft selectively connectable with at least one of the first shaft and the fourth shaft, a seventh shaft directly connected with the output shaft, and an eighth shaft selectively connectable with the sixth shaft.

7 Claims, 2 Drawing Sheets

FIG. 2

| Shift-stage | C1 | C2 | C3 | C4 | B1 | B2 | Gear ratio |
|---|---|---|---|---|---|---|---|
| D1 |  |  |  | ● | ● | ● | 3.569 |
| D2 |  | ● |  | ● |  | ● | 1.714 |
| D3 |  | ● |  | ● | ● |  | 1.439 |
| D4 |  | ● | ● |  | ● |  | 1.204 |
| D5 |  | ● | ● |  |  | ● | 1.071 |
| D6 | ● | ● | ● |  |  |  | 1.000 |
| D7 | ● |  | ● |  |  | ● | 0.865 |
| D8 | ● |  | ● |  | ● |  | 0.714 |
| D9 | ● |  |  |  | ● | ● | 0.598 |
| D10 | ● |  |  | ● | ● |  | 0.541 |
| REV |  |  | ● | ● |  | ● | -4.091 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0170991, filed Dec. 2, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle of improving power delivery performance and fuel efficiency by achieving ten forward speed stages using a driving point positioned at a low engine speed.

Description of Related Art

Recent increases in oil prices are triggering stiff competition in enhancing fuel consumption of a vehicle.

In this sense, research is being conducted on engines in terms of reducing weight and improving fuel efficiency by down-sizing, and research is also being conducted to ensure both drivability and competitiveness by maximizing fuel efficiency by implementing an automatic transmission with multiple speed-stages.

However, in the automatic transmission, as the number of speed stages increase, the number of internal components (particularly, planetary gear sets) increase, which may deteriorate installability and/or power flow efficiency and may increase production cost, and weight.

Therefore, in order to increase an effect of improving fuel efficiency by implementing an automatic transmission with multiple speed-stages, it is important to develop a planetary gear train capable of maximizing efficiency using a small number of components.

In this respect, an eight-speed automatic transmission has been recently introduced, and a planetary gear train for an automatic transmission enabling more shift stages is under investigation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power transfer performance and fuel costs by a multi-staging of shift stages by implementing 10 forward-speed shift stages and 1 reverse-speed shift stage by a minimum configuration, and improving silence drivability of the vehicle by using a drive point in a low revolution per minute (RPM) region of an engine.

According to various aspects of the present invention, a planetary gear train of an automatic transmission for a vehicle may include an input shaft for receiving an engine torque, an output shaft for outputting a shifted torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, six control elements for selectively interconnecting the rotation elements and a transmission housing, a first shaft integrally connected with the first rotation element and selectively connectable with the transmission housing, a second shaft integrally connected with the second rotation element and the sixth rotation element, a third shaft integrally connected with the third rotation element and the seventh rotation element, a fourth shaft integrally connected with the fourth rotation element and the twelfth rotation element and directly connected with the input shaft, a fifth shaft integrally connected with the fifth rotation element, and selectively connectable with the third shaft, and selectively connectable with the transmission housing, a sixth shaft integrally connected with the eighth rotation element, and selectively connectable with at least one of the first shaft and the fourth shaft, a seventh shaft integrally connected with the ninth rotation element and the eleventh rotation element, and directly connected with the output shaft, and an eighth shaft integrally connected with the tenth rotation element, and selectively connectable with the sixth shaft.

The first planetary gear set may be a single pinion planetary gear set, where the first rotation element may be a first sun gear, the second rotation element may be a first planet carrier, and the third rotation element may be a first ring gear, the second planetary gear set may be a single pinion planetary gear set, where the fourth rotation element may be a second sun gear, the fifth rotation element may be a second planet carrier, and the sixth rotation element may be a second ring gear, the third planetary gear set may be a single pinion planetary gear set, where the seventh rotation element may be a third sun gear, the eighth rotation element may be a third planet carrier, and the ninth rotation element may be a third ring gear, and the fourth planetary gear set may be a single pinion planetary gear set, where the tenth rotation element may be a fourth sun gear, the eleventh rotation element may be a fourth planet carrier, and the twelfth rotation element may be a fourth ring gear.

The six control elements may include a first clutch selectively connecting the fourth shaft and the sixth shaft, a second clutch selectively connecting the sixth shaft and the eighth shaft, a third clutch selectively connecting the third shaft and the fifth shaft, a fourth clutch selectively connecting the first shaft and sixth shaft, a first brake selectively connecting the fifth shaft and the transmission housing, and a second brake selectively connecting the first shaft and the transmission housing.

Shift stages realized by selective operation of three control elements of the six control elements include a first forward speed formed by operation of the fourth clutch and the first and second brakes, a second forward speed formed by operation of the second and fourth clutches and the second brake, a third forward speed formed by operation of the second and fourth clutches and the first brake, a fourth forward speed formed by operation of the second and third clutches and the first brake, a fifth forward speed formed by operation of the second and third clutches and the second brake, a sixth forward speed formed by operation of the first, second, and third clutches, a seventh forward speed formed by operation of the first and third clutches and the second brake, an eighth forward speed formed by operation of the first and third clutches and the first brake, a ninth forward speed formed by operation of the first clutch and the first and second brakes, a tenth forward speed formed by operation of the first and fourth clutches and the first brake, a reverse speed formed by operation of the third and fourth clutches and the second brake.

According to various aspects of the present invention, a planetary gear train of an automatic transmission for a vehicle may include an input shaft for receiving an engine torque, an output shaft for outputting a shifted torque, a first planetary gear set as a single pinion planetary gear set including first, second, and third rotation elements, a second planetary gear set as a single pinion planetary gear set including fourth, fifth, and sixth rotation elements, a third planetary gear set as a single pinion planetary gear set including seventh, eighth, and ninth rotation elements, a fourth planetary gear set as a single pinion planetary gear set including tenth, eleventh, and twelfth rotation elements, a first shaft integrally connected with the first rotation element, and selectively connectable with a transmission housing, a second shaft integrally connected with the second rotation element and the sixth rotation element, a third shaft integrally connected with the third rotation element and the seventh rotation element, a fourth shaft integrally connected with the fourth rotation element and the twelfth rotation element, and directly connected with the input shaft, a fifth shaft integrally connected with the fifth rotation element, and selectively connectable with the third shaft, and selectively connectable with the transmission housing, a sixth shaft integrally connected with the eighth rotation element, and selectively connectable with the at least one of the first shaft and the fourth shaft, a seventh shaft integrally connected with the ninth rotation element and the eleventh rotation element, and directly connected with the output shaft, an eighth shaft integrally connected with the tenth rotation element, and selectively connectable with the sixth shaft, a first clutch selectively connecting the fourth shaft and the sixth shaft, a second clutch selectively connecting the sixth shaft and the eighth shaft, a third clutch selectively connecting the third shaft and the fifth shaft, a fourth clutch selectively connecting the first shaft and sixth shaft, a first brake selectively connecting the fifth shaft and the transmission housing, and a second brake selectively connecting the first shaft and the transmission housing.

The first planetary gear set may include a first sun gear as the first rotation element, a first planet carrier as the second rotation element, and a first ring gear as the third rotation element, the second planetary gear set may include a second sun gear as the fourth rotation element, a second planet carrier as the fifth rotation element, and a second ring gear as the sixth rotation element, the third planetary gear set may include a third sun gear as the seventh rotation element, a third planet carrier as the eighth rotation element, and a third ring gear as the ninth rotation element, and the fourth planetary gear set may include a fourth sun gear as the tenth rotation element, a fourth planet carrier as the eleventh rotation element, and a fourth ring gear as the twelfth rotation element.

According to various aspects of the present invention, a planetary gear train of an automatic transmission for a vehicle may include an input shaft for receiving an engine torque, an output shaft for outputting a shifted torque, a first planetary gear set as a single pinion planetary gear set including a first sun gear, a first planet carrier, and a first ring gear, a second planetary gear set as a single pinion planetary gear set including a second sun gear, a second planet carrier, and a second ring gear, a third planetary gear set as a single pinion planetary gear set including a third sun gear, a third planet carrier, and a third ring gear, a fourth planetary gear set as a single pinion planetary gear set including a fourth sun gear, a fourth planet carrier, and a fourth ring gear, a first shaft integrally connected with the first rotation element, and selectively connectable with a transmission housing, a second shaft integrally connected with the second rotation element and the sixth rotation element, a third shaft integrally connected with the third rotation element and the seventh rotation element, a fourth shaft integrally connected with the fourth rotation element and the twelfth rotation element, and directly connected with the input shaft, a fifth shaft integrally connected with the fifth rotation element, and selectively connectable with the third shaft, and selectively connectable with the transmission housing, a sixth shaft integrally connected with the eighth rotation element, and selectively connectable with at least one of the first shaft and the fourth shaft, a seventh shaft integrally connected with the ninth rotation element and the eleventh rotation element, and directly connected with the output shaft, an eighth shaft integrally connected with the tenth rotation element, and selectively connectable with the sixth shaft, and six control elements selectively interconnecting the shafts and the transmission housing.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages in the planetary gear train according to various embodiments of the present invention.

Figure 1:
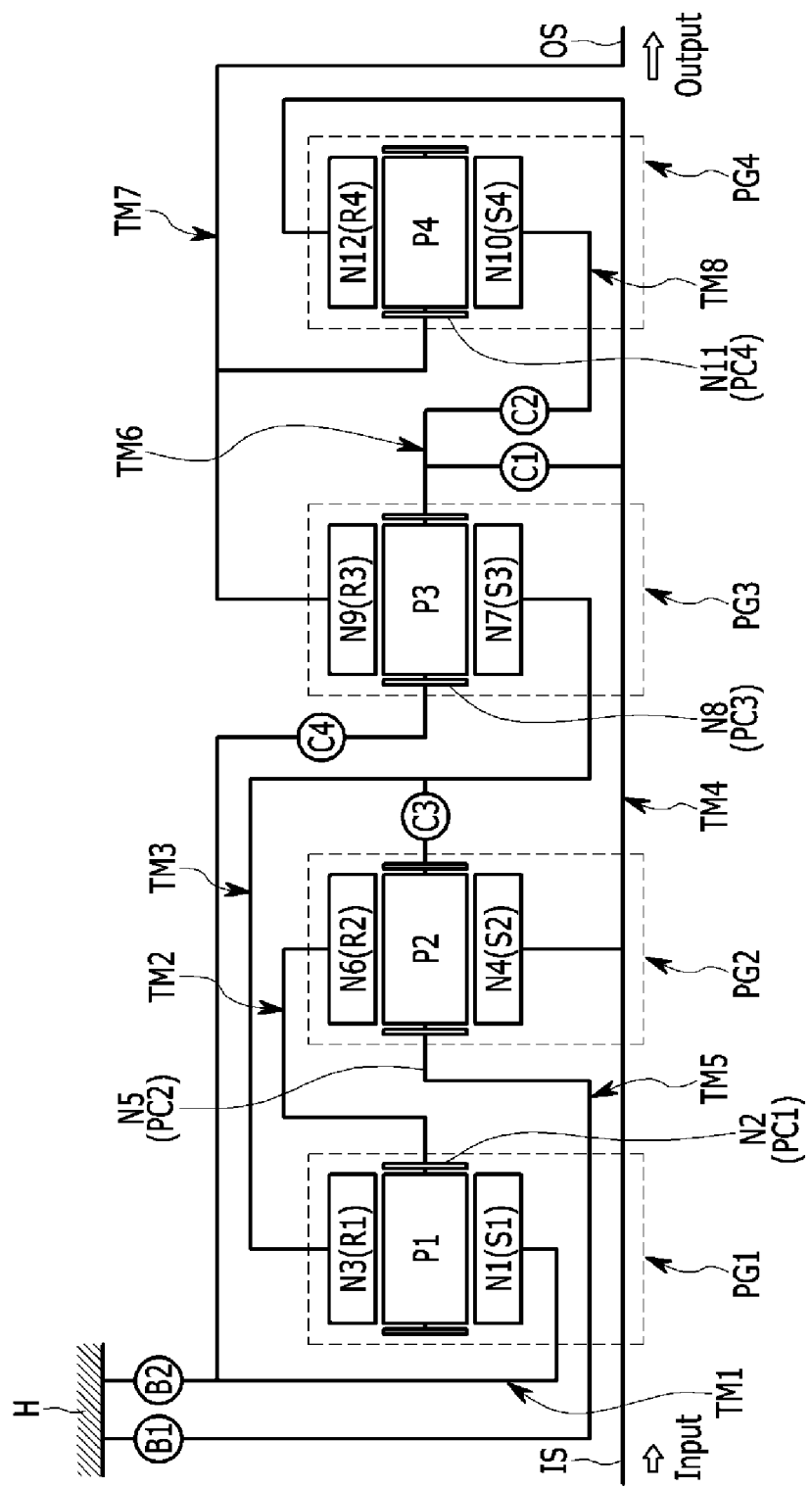
FIG. 1 is a schematic diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear set PG1, PG2, PG3, and PG4 arranged on a same axis, an input shaft IS, and output shaft OS, eight rotating shafts TM1 to TM8 directly interconnecting rotation elements of the first, second, third, and fourth planetary gear sets PG1, PG2, PG3, and PG4, six control elements C1 to C4 and B1 to B2, and a transmission housing H.

Torque input from the input shaft IS shifted by cooperative operation of the first, second, third, and fourth planetary gear sets PG1, PG2, PG3, and PG4, and then output through the output shaft OS.

The simple planetary gear sets are arranged in the order of first, second, third, and fourth planetary gear sets PG1, PG2, PG3, and PG4, from an engine side.

The input shaft IS is an input member, and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotation element N10, the fourth planet carrier PC4 acts as an eleventh rotation element N11, and the fourth ring gear R4 acts as a twelfth rotation element N12.

In the arrangement of the first, second, third, and fourth planetary gear sets PG1, PG2, PG3, and PG4, the second rotation element N2 is directly connected with the sixth rotation element N6, the third rotation element N3 is directly connected with the seventh rotation element N7, the fourth rotation element N4 is directly connected with the twelfth rotation element N12, and the ninth rotation element N9 is directly connected with the eleventh rotation element N11, by eight rotating shafts TM1 to TM8.

The eight rotating shafts TM1 to TM8 are arranged as follows.

The first rotating shaft TM1 is integrally connected with the first rotation element N1 (first sun gear S1), and selectively connectable with the transmission housing H, thereby acting as a selective fixed element.

The second rotating shaft TM2 is integrally connected with the second rotation element N2 (first planet carrier PC1) and the fifth rotation element N6 (second ring gear R2).

The third rotating shaft TM3 is integrally connected with the third rotation element N3 (first ring gear R1) and the seventh N7 (third sun gear S3).

The fourth rotating shaft TM4 is integrally connected with the fourth rotation element N4 (second sun gear S4) and twelfth rotation element N12 (fourth ring gear S4), and directly connected with the input shaft IS, thereby continuously acting as an input element.

The fifth rotating shaft TM5 is integrally connected with the fifth rotation element N5 (second planet carrier PC2), and selectively connectable with the third rotating shaft TM3, and selectively connectable with the transmission housing H, thereby acting as a selective fixed element.

The sixth rotating shaft TM6 is integrally connected with the eighth rotation element N8 (third planet carrier PC3), and selectively connectable with one or both of the first and fourth rotating shafts TM1 and TM4.

The seventh rotating shaft TM7 is integrally connected with the ninth rotation element N9 (third ring gear R3) and the eleventh rotation element N11 (fourth planet carrier PC4}, and directly connected with the output shaft OS, thereby continuously acting as an output element.

The eighth rotating shaft TM8 is integrally connected with the tenth rotation element N10 (fourth sun gear S4), and selectively connectable with the sixth rotating TM6, thereby acting a selective fixed element.

The rotating shafts TM1 to TM8 may be selectively interconnected with one another by control elements of four clutches C1, C2, C3, and C4.

In addition, the rotating shaft TM1 to TM8 may be selectively connectable with the transmission housing H, by control elements of two brakes B1 and B2.

The six control elements C1 to C4 and B1 to B2 are arranged as follows.

The first clutch C1 is arranged between the fourth rotating shaft TM4 and the sixth rotating shaft TM6, such that the fourth rotating shaft TM4 and the sixth rotating shaft TM6 may be selectively become integral.

The second clutch C2 is arranged between the sixth rotating shaft TM6 and the eighth rotating shaft TM8, such that the sixth rotating shaft TM6 and the eighth rotating shaft TM8 may be selectively become integral.

The third clutch C3 is arranged between the third rotating shaft TM3 and the fifth rotating shaft TM5, such that the third rotating shaft TM3 and the fifth rotating shaft TM5 may be selectively become integral.

The fourth clutch C4 is arranged between the first rotating shaft TM1 and the sixth rotating shaft TM6, such that the first rotating shaft TM1 and the sixth rotating shaft TM6 may be selectively become integral.

The first brake B1 is arranged between the fifth rotating shaft TM5 and the transmission housing H, such that the fifth rotating shaft TM5 may selectively act as a fixed element.

The second brake B2 is arranged between the first rotating shaft TM1 and the transmission housing H, such that the first rotating shaft TM1 may selectively act as a fixed element.

The control elements of the first, second, third, and fourth clutches C1, C2, C3, and C4 and the first and second brakes B1 and B2 may be realized as multi-plate hydraulic pressure friction devices that are frictionally engaged by hydraulic pressure.

FIG. 2 is an operational chart for respective control elements at respective shift-stages in the planetary gear train according to various embodiments of the present invention.

As shown in FIG. 2, the planetary gear train according to various embodiments of the present invention performs shifting by operating three control elements at respective shift stages.

In the first forward speed D1, the fourth clutch C4 and the first and second brakes B1 and B2 are operated. As a result, the first rotating shaft TM1 is connected with the sixth rotating shaft TM6 by the operation of the fourth clutch C4. In this state, torque of the input shaft IS is input to the fourth rotating shaft TM4. In addition, the fifth and first rotating shafts TM5 and TM1 acts as a fixed element by the operation of the first and second brakes B1 and B2, thereby realizing the first forward speed by cooperative operation of respective rotating shafts and outputting a shifted torque through the output shaft OS connected with the seventh rotating shaft TM7.

In the second forward speed D2, the second and fourth clutches C2 and C4 and the second brake B2 are operated. As a result, the sixth rotating shaft TM6 is connected with the eighth rotating shaft TM8 by the operation of the second clutch C2, and the first rotating shaft TM1 is connected with the sixth rotating shaft TM6 by the operation of the fourth clutch C4. In this state, torque of the input shaft IS is input to the fourth rotating shaft TM4. In addition, the first rotating shaft TM1 acts as a fixed element by the operation of the second brake B2, thereby realizing the second forward speed by cooperative operation of respective rotating shafts and outputting a shifted torque through the output shaft OS which is connected with the seventh rotating shaft TM7.

In the third forward speed D3, the second and fourth clutches C2 and C4 and the first brake B1 are operated. As a result, the sixth rotating shaft TM6 is connected with the eighth rotating shaft TM8 by the operation of the second clutch C2, and the first rotating shaft TM1 is connected with the sixth rotating shaft TM6 by the operation of the fourth clutch C4. In this state, torque of the input shaft IS is input to the fourth rotating shaft TM4. In addition, the fifth rotating shaft TM5 acts as a fixed element by the operation of the first brake B1, thereby realizing the third forward speed by cooperative operation of respective rotating shafts and outputting a shifted torque through the output shaft OS which is connected with seventh rotating shaft TM7.

In the fourth forward speed D4, the second and third clutches C2 and C3 and the first brake B1 are operated. As a result, the sixth rotating shaft TM6 is connected with the eighth rotating shaft TM8 by the operation of the second clutch C2, and the third rotating shaft TM3 is connected with fifth rotating shaft TM5 by the operation of the third clutch C3. In this state, torque of the input shaft IS is input to the fourth rotating shaft TM4. In addition, the fifth rotating shaft TM5 acts as a fixed element by the operation of the first brake B1, thereby realizing the fourth forward speed by cooperative operation of respective rotating shafts and outputting a shifted torque through the output shaft OS which is connected with the seventh rotating shaft TM7.

In the fifth forward speed D5, the second and third clutches C2 and C3 and the second brake B2 are operated. As a result, the sixth rotating shaft TM6 is connected with eighth rotating shaft TM8 by the operation of the second clutch C2, and the third rotating shaft TM3 is connected with the fifth rotating shaft TM5 by the operation of the third clutch C3. In this state, torque of the input shaft IS is input to the fourth rotating shaft TM4. In addition, the first rotating shaft TM1 acts as a fixed element by the operation of the second brake B2, thereby realizing the fifth forward speed by cooperative operation of respective rotating shafts and outputting a shifted torque through the output shaft OS which is connected with the seventh rotating shaft TM7.

In the sixth forward speed D6, the first, second, and third clutches C1, C2, and C3 are operated. As a result, the fourth rotating shaft TM4 is connected with the sixth rotating shaft TM6 by the operation of the first clutch C1, and the sixth rotating shaft TM6 is connected with the eighth rotating shaft TM8 by operation of the second clutch C2, and the third rotating shaft TM3 is connected with the fifth rotating shaft TM5 by the operation of the third clutch C3. In this state, torque of the input shaft IS is input to the fourth rotating shaft TM4. Then, the first, second, third, and fourth planetary gear set PG1, PG2, PG3, and PG4 integrally rotate at a same speed with the input shaft IS, thereby realizing the sixth forward speed and outputting a same torque as input through the output shaft OS which is connected with the seventh rotating shaft TM7.

In seventh forward speed D7, the first and third clutches C1 and C3 and the second brake B2 are operated. As a result, the fourth rotating shaft TM4 is connected with the sixth rotating shaft TM6 by the operation of the first clutch C1, and the third rotating shaft TM3 is connected with the fifth rotating shaft TM5 by the operation of the third clutch C3. In this state, torque of the input shaft IS is input to the fourth rotating shaft TM4. In addition, the first rotating shaft TM1 acts as a fixed element by the operation of the second brake B2, thereby realizing the seventh forward speed by cooperative operation of respective rotating shafts and outputting a shifted torque through the output shaft OS which is connected with the seventh rotating shaft TM7.

In eighth forward speed D8, the first and third clutches C1 and C3 and the first brake B1 are operated. As a result, the fourth rotating shaft TM4 is connected with the sixth rotating shaft TM6 by the operation of the first clutch C1, and the third rotating shaft TM3 is connected with the fifth rotating shaft TM5 by the operation of the third clutch C3. In this state, torque of the input shaft IS is input to the fourth rotating shaft TM4. In addition, the fifth rotating shaft TM5 acts as a fixed element by the operation of the first brake B1, thereby realizing the eighth forward speed by cooperative operation of respective rotating shafts and outputting a shifted torque through the output shaft OS which is connected with the seventh rotating shaft TM7.

In the ninth forward speed D9, the first clutch C1 and the first and second brakes B1 and B2 are operated. As a result, the fourth rotating shaft TM4 is connected with the sixth rotating shaft TM6 by the operation of the first clutch C1. In this state, torque of the input shaft IS is input to the fourth rotating shaft TM4. In addition, the fifth and first rotating shafts TM5 and TM1 act as fixed elements by the operation of the first and second brakes B1 and B2, thereby realizing the ninth forward speed by cooperative operation of respective rotating shafts and outputting a shifted torque through the output shaft OS which is connected with the seventh rotating shaft TM7.

In the tenth forward speed D10, the first and fourth clutches C1 and C4 and the first brake B1 are operated. As a result, the fourth rotating shaft TM4 is connected with sixth rotating shaft TM6 by the operation of the first clutch C1, and the first rotating shaft TM1 is connected with the sixth rotating shaft TM6 by the operation of the fourth clutch C4. In this state, torque of the input shaft IS is input to the fourth rotating shaft TM4. In addition, the fifth rotating shaft TM5 acts as a fixed element by the operation of the first brake B1, thereby realizing the tenth forward speed by cooperative operation of respective rotating shafts and outputting a shifted torque through the output shaft OS which is connected with the seventh rotating shaft TM7.

In the reverse speed REV, the third and fourth clutches C3 and C4 and the second brake B2 are operated. As a result, the third rotating shaft TM3 is connected with the fifth rotating shaft TM5 by the operation of the third clutch C3, and the first rotating shaft TM1 is connected with the sixth rotating shaft TM6 by the operation of the fourth clutch C4. In this state, torque of the input shaft IS is input to the fourth rotating shaft TM4. In addition, the first rotating shaft TM1 acts as a fixed element by the operation of the second brake B2, thereby realizing the reverse speed by cooperative operation of respective rotating shafts and outputting a shifted torque through the output shaft OS which is connected with the seventh rotating shaft TM7.

As described above, a planetary gear train according to various embodiments of the present invention realizes at least ten forward speeds and at least one reverse speed formed by operating the four planetary gear sets PG1, PG2, PG3, and PG4 by controlling the four clutches C1, C2, C3, and C4 and the two brakes B1 and B2.

In addition, a planetary gear train according to various embodiments of the present invention substantially improves driving stability by realizing shift stages appropriate for rotation speed of an engine due to multiple speed-stages of an automatic transmission.

Furthermore, a planetary gear train according to various embodiments of the present invention maximizes engine driving efficiency by multiple speed-stages of an automatic transmission, and improves power delivery performance and fuel consumption.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft for receiving an engine torque;
    an output shaft for outputting a shifted torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    a first shaft integrally connected with the first rotation element and selectively connectable with a transmission housing;
    a second shaft integrally connected with the second rotation element and the sixth rotation element;
    a third shaft integrally connected with the third rotation element and the seventh rotation element;
    a fourth shaft integrally connected with the fourth rotation element and the twelfth rotation element and directly connected with the input shaft;
    a fifth shaft integrally connected with the fifth rotation element, and selectively connectable with the third shaft, and selectively connectable with the transmission housing;
    a sixth shaft integrally connected with the eighth rotation element, and selectively connectable with at least one of the first shaft and the fourth shaft;
    a seventh shaft integrally connected with the ninth rotation element and the eleventh rotation element, and directly connected with the output shaft; and
    an eighth shaft integrally connected with the tenth rotation element, and selectively connectable with the sixth shaft,
    wherein a first forward speed formed by operation of a fourth clutch and first and second brakes;
    wherein a second forward speed formed by operation of a second clutch, the fourth clutch and the second brake;
    wherein a third forward speed formed by operation of the second and fourth clutches and the first brake;
    wherein a fourth forward speed formed by operation of the second clutch and a third clutch and the first brake;
    wherein a fifth forward speed formed by operation of the second and third clutches and the second brake;
    wherein a sixth forward speed formed by operation of a first clutch and the second and third clutches;
    wherein a seventh forward speed formed by operation of the first and third clutches and the second brake;
    wherein an eighth forward speed formed by operation of the first and third clutches and the first brake;
    wherein a ninth forward speed formed by operation of the first clutch and the first and second brakes;
    wherein a tenth forward speed formed by operation of the first clutch and a fourth clutch and the first brake; and
    wherein a reverse speed formed by operation of the third and fourth clutches and the second brake.

2. The planetary gear train of claim 1, wherein
    the first planetary gear set comprises a single pinion planetary gear set, where the first rotation element is a first sun gear, the second rotation element is a first planet carrier, and the third rotation element is a first ring gear;
    the second planetary gear set comprises a single pinion planetary gear set, where the fourth rotation element is a second sun gear, the fifth rotation element is a second planet carrier, and the sixth rotation element is a second ring gear;
    the third planetary gear set comprises a single pinion planetary gear set, where the seventh rotation element is a third sun gear, the eighth rotation element is a third planet carrier, and the ninth rotation element is a third ring gear; and the fourth planetary gear set is a single pinion planetary gear set, where the tenth rotation element is a fourth sun gear, the eleventh rotation element is a fourth planet carrier, and the twelfth rotation element is a fourth ring gear.

3. The planetary gear train of claim 1, wherein:
the first clutch selectively connects the fourth shaft and the sixth shaft;
the second clutch selectively connects the sixth shaft and the eighth shaft;
the third clutch selectively connects the third shaft and the fifth shaft;
the fourth clutch selectively connects the first shaft and sixth shaft;
the first brake selectively connects the fifth shaft and the transmission housing; and
the second brake selectively connects the first shaft and the transmission housing.

4. A planetary gear train of an automatic transmission for a vehicle, comprising:
an input shaft for receiving an engine torque;
an output shaft for outputting a shifted torque;
a first planetary gear set as a single pinion planetary gear set including a first rotation element, a second rotation element, and a third rotation element;
a second planetary gear set as a single pinion planetary gear set including a fourth rotation element, a fifth rotation element, and a sixth rotation element;
a third planetary gear set as a single pinion planetary gear set including a seventh rotation element, an eighth rotation element, and a ninth rotation element;
a fourth planetary gear set as a single pinion planetary gear set including a tenth rotation element, an eleventh rotation element, and a twelfth rotation element;
a first shaft integrally connected with the first rotation element, and selectively connectable with a transmission housing;
a second shaft integrally connected with the second rotation element and the sixth rotation element;
a third shaft integrally connected with the third rotation element and the seventh rotation element;
a fourth shaft integrally connected with the fourth rotation element and the twelfth rotation element, and directly connected with the input shaft;
a fifth shaft integrally connected with the fifth rotation element, and selectively connectable with the third shaft, and selectively connectable with the transmission housing;
a sixth shaft integrally connected with the eighth rotation element, and selectively connectable with the at least one of the first shaft and the fourth shaft;
a seventh shaft integrally connected with the ninth rotation element and the eleventh rotation element, and directly connected with the output shaft;
an eighth shaft integrally connected with the tenth rotation element, and selectively connectable with the sixth shaft;
a first clutch selectively connecting the fourth shaft and the sixth shaft;
a second clutch selectively connecting the sixth shaft and the eighth shaft;
a third clutch selectively connecting the third shaft and the fifth shaft;
a fourth clutch selectively connecting the first shaft and sixth shaft;
a first brake selectively connecting the fifth shaft and the transmission housing; and
a second brake selectively connecting the first shaft and the transmission housing,
wherein a first forward speed formed by operation of the fourth clutch and the first and second brakes;
wherein a second forward speed formed by operation of the second and fourth clutches and the second brake;
wherein a third forward speed formed by operation of the second and fourth clutches and the first brake;
wherein a fourth forward speed formed by operation of the second and third clutches and the first brake;
wherein a fifth forward speed formed by operation of the second and third clutches and the second brake;
wherein a sixth forward speed formed by operation of the first, second, and third clutches;
wherein a seventh forward speed formed by operation of the first and third clutches and the second brake;
wherein an eighth forward speed formed by operation of the first and third clutches and the first brake;
wherein a ninth forward speed formed by operation of the first clutch and the first and second brakes;
wherein a tenth forward speed formed by operation of the first and fourth clutches and the first brake; and
wherein a reverse speed formed by operation of the third and fourth clutches and the second brake.

5. The planetary gear train of claim 4, wherein
the first planetary gear set includes a first sun gear as the first rotation element, a first planet carrier as the second rotation element, and a first ring gear as the third rotation element;
the second planetary gear set includes a second sun gear as the fourth rotation element, a second planet carrier as the fifth rotation element, and a second ring gear as the sixth rotation element;
the third planetary gear set includes a third sun gear as the seventh rotation element, a third planet carrier as the eighth rotation element, and a third ring gear as the ninth rotation element; and
the fourth planetary gear set includes a fourth sun gear as the tenth rotation element, a fourth planet carrier as the eleventh rotation element, and a fourth ring gear as the twelfth rotation element.

6. A planetary gear train of an automatic transmission for a vehicle, comprising:
an input shaft for receiving an engine torque;
an output shaft for outputting a shifted torque;
a first planetary gear set as a single pinion planetary gear set including a first sun gear, a first planet carrier, and a first ring gear;
a second planetary gear set as a single pinion planetary gear set including a second sun gear, a second planet carrier, and a second ring gear;
a third planetary gear set as a single pinion planetary gear set including a third sun gear, a third planet carrier, and a third ring gear;
a fourth planetary gear set as a single pinion planetary gear set including a fourth sun gear, a fourth planet carrier, and a fourth ring gear;
a first shaft integrally connected with the first rotation element, and selectively connectable with a transmission housing;
a second shaft integrally connected with the second rotation element and the sixth rotation element;
a third shaft integrally connected with the third rotation element and the seventh rotation element;
a fourth shaft integrally connected with the fourth rotation element and the twelfth rotation element, and directly connected with the input shaft;

a fifth shaft integrally connected with the fifth rotation element, and selectively connectable with the third shaft, and selectively connectable with the transmission housing;

a sixth shaft integrally connected with the eighth rotation element, and selectively connectable with at least one of the first shaft and the fourth shaft;

a seventh shaft integrally connected with the ninth rotation element and the eleventh rotation element, and directly connected with the output shaft;

an eighth shaft integrally connected with the tenth rotation element, and selectively connectable with the sixth shaft; and wherein a first forward speed formed by operation of a fourth clutch and first and second brakes;

wherein a second forward speed formed by operation of a second clutch and the fourth clutch and the second brake;

wherein a third forward speed formed by operation of the second and fourth clutches and the first brake;

wherein a fourth forward speed formed by operation of the second clutch and a third clutch and the first brake;

wherein a fifth forward speed formed by operation of the second and third clutches and the second brake;

wherein a sixth forward speed formed by operation of the first and second clutches and the third clutch;

wherein a seventh forward speed formed by operation of the first and third clutches and the second brake;

wherein an eighth forward speed formed by operation of the first and third clutches and the first brake;

wherein a ninth forward speed formed by operation of the first clutch and the first and second brakes;

wherein a tenth forward speed formed by operation of the first clutch, a fourth clutch and the first brake; and wherein a reverse speed formed by operation of the third and fourth clutches and the second brake.

7. The planetary gear train of claim 6, wherein:

the first clutch selectively connects the fourth shaft and the sixth shaft;

the second clutch selectively connects the sixth shaft and the eighth shaft;

the third clutch selectively connects the third shaft and the fifth shaft;

the fourth clutch selectively connects the first shaft and sixth shaft;

the first brake selectively connects the fifth shaft and the transmission housing; and the second brake selectively connects the first shaft and the transmission housing.

\* \* \* \* \*